(12) United States Patent
Koumura et al.

(10) Patent No.: US 7,162,785 B2
(45) Date of Patent: Jan. 16, 2007

(54) METHOD OF RECYCLING A PROCESS CARTRIDGE

(75) Inventors: Noboru Koumura, Ibaraki (JP); Toshio Kayahashi, Ibaraki (JP)

(73) Assignee: Canon Kabushiki Kaisha (JP)

( * ) Notice: Subject to any disclaimer, the term of this patent is extended or adjusted under 35 U.S.C. 154(b) by 373 days.

(21) Appl. No.: 10/739,146

(22) Filed: Dec. 19, 2003

(65) Prior Publication Data

US 2005/0076487 A1   Apr. 14, 2005

(30) Foreign Application Priority Data

Dec. 19, 2002   (JP)   ............................. 2002-368255

(51) Int. Cl.
  *B07B 13/00*   (2006.01)
  *B23P 17/04*   (2006.01)

(52) U.S. Cl. .................. 29/403.1; 29/403.2; 29/403.3; 29/403.4; 241/24.1; 241/24.12; 241/24.13; 241/24.25

(58) Field of Classification Search ............... 29/403.1, 29/403.2, 403.3, 403.4, 426.1, 426.2, 426.3, 29/426.4, 426.5; 241/24.1, 24.12, 24.13, 241/24.14, 24.17, 24.18, 24.25, 24.28; 399/109, 399/111
See application file for complete search history.

(56) References Cited

U.S. PATENT DOCUMENTS

| 3,605,243 A | * | 9/1971 | Oster | ......................... 29/403.3 |
| 3,615,084 A | * | 10/1971 | Wasinger | ...................... 75/403 |
| 3,905,556 A | * | 9/1975 | Drage | ........................... 241/19 |
| 5,060,871 A | * | 10/1991 | Brassinga et al. | ............. 241/3 |
| 2003/0199596 A1 | | 10/2003 | Koike et al. | ................... 521/40 |
| 2004/0250399 A1 | * | 12/2004 | Koumura et al. | .......... 29/403.3 |
| 2005/0174406 A1 | * | 8/2005 | Morriss et al. | ............... 347/93 |

FOREIGN PATENT DOCUMENTS

| DE | 19821545 | | 11/1999 |
| GB | 2287904 A | * | 10/1995 |
| JP | 5-301222 | | 11/1993 |
| JP | 9-150137 | | 6/1997 |
| JP | 9-206685 | | 8/1997 |
| JP | 11-156224 | | 6/1999 |
| JP | 2000-159900 | | 6/2000 |
| JP | 2001-30248 | | 2/2001 |
| JP | 2001-205245 | | 7/2001 |
| WO | WO 03/106938 | | 12/2003 |

* cited by examiner

*Primary Examiner*—Jermie E. Cozart
(74) *Attorney, Agent, or Firm*—Fitzpatrick, Cella, Harper & Scinto

(57) ABSTRACT

The recycling of metal materials is performed by efficiently recovering the metal materials from component materials of a process cartridge. To achieve this object, there is provided a method of recycling a process cartridge containing a toner, wherein in a crushing process of a process cartridge containing a recovered toner, a container shape of the process cartridge is subjected to disassembly treatment to an extent of main component parts, the toner is recovered by suction in a step of disassembly treatment, metal materials, such as ferrous materials and aluminum materials, in component materials of the process cartridge are subjected to separation treatment after the step of disassembly treatment, and each of the materials is subjected to melting treatment thereby to change the materials into forms capable of reuse as ferrous materials and aluminum materials.

6 Claims, 6 Drawing Sheets

METHOD OF RECYCLING A PROCESS CARTRIDGE

FIELD OF THE INVENTION

The present invention relates to a method of recycling metal materials contained in materials constituting a process cartridge used in an image forming device of a copying machine, a printer, etc.

Furthermore, the invention relates to a method of recycling metal materials contained in materials constituting a process cartridge containing a toner.

BACKGROUND OF THE INVENTION

Prior data on a method of scrapping disposal of process cartridges including toners used in coping machines, printers, etc. is described in the Japanese Patent Laid-Open No. 09-150137.

Also, measures to prevent dust explosions due to the ignition of fine powders are necessary for the pulverizing treatment of process cartridges containing toner, etc., and there is a technique disclosed in the Japanese Patent Laid-Open No. 11-156224 as one of such measures.

Furthermore, the Japanese Patent Laid-Open No. 05-301222, the Japanese Patent Laid-Open No. 2000-159900 and the Japanese Patent Laid-Open No. 2001-030248 disclose techniques related to the recycling of thermoplastic resin materials used in the parts of office equipment, such as copying machines, printers, facsimile machines and televisions, and electrical machinery and apparatus.

In addition, an invention related to the separation treatment of toners of used process cartridges is disclosed in the Japanese Patent Laid-Open No. 2001-205245.

Also, an invention related to powder disposal is disclosed in the Japanese Patent Laid-Open No. 09-206685.

Copying machines and printers have come into widespread use within companies and also among individuals and the recovered amount of used process cartridges has been continuing to increase.

The consumption of metal materials used in process cartridges is also large and, for this reason, the effective use of these materials used in process cartridges by recycling them has been required.

In the recycling of metal materials used in process cartridges which are covered by the present invention, it is necessary to have the processes of recovering used process cartridges, of crushing and separating them, and of sorting them into each component material.

For this purpose, it is first necessary to crush process cartridges for each component part.

If process cartridges are crushed too finely in the primary crushing process of process cartridges, it becomes difficult to perform separation in the separation treatment of resin materials, rubber materials, etc. in succeeding processes.

For this reason, in the succeeding processes, the number of disposal steps increases and it becomes necessary to use a high-accuracy separation apparatus of resin materials, with the result that the cost of recycled materials increases.

Accordingly, for the degree of crushing in the primary crushing process of process cartridges, it is important that parts constituted by multiple kinds of materials, such as metal materials and rubber materials, for example, a charging roller and a cleaning blade be subjected to crushing treatment in the primary crushing process to such an extent that the above-described parts, i.e., rubber materials, can be separated from the containers of the process cartridges without destroying their shapes.

However, in some unit parts, such as a photosensitive drum, which are constituted by aluminum and resin materials, it is impossible to separate the aluminum and resin materials from each other with the crushing strength of the primary crushing process.

The crushed state of crushed matter in the primary crushing process of process cartridges is such that metal materials, rubber materials and resin materials coexist.

SUMMARY OF THE INVENTION

The task of the present invention is to recover metal materials which are recycled from a used process cartridge with high purity, to thereby reduce the cost of recycling.

To accomplish the above-described task, in the present invention, there is provided a method of recycling a process cartridge containing a toner, wherein in a crushing process of a process cartridge containing a recovered toner, the major component parts of the container of the process cartridge are subjected to a disassembly treatment, the toner is recovered by suction in a step of disassembly treatment, metal materials, such as ferrous materials and aluminum materials, in component materials of the process cartridge, are subjected to separation treatment after the step of disassembly treatment, and each of the materials is subjected to melting treatment to thereby change the materials to forms capable of reuse as ferrous materials and aluminum materials.

Another aspect of the invention is to provide a method of recycling metal materials constituting a process cartridge containing a toner, wherein photosensitive drum parts, charging roller parts, cleaning blade parts and development sleeve parts that constitute the process cartridge and container parts made of a resin material containing each of the materials as well, are disassembled into a state separated from the container parts while performing the recovery of the toner by suction in a crushing process, metal materials are thereafter extracted from the parts by separating dissimilar materials by use of magnetic separation means, eddy current separation means and gravity separation means, and the extracted materials are recycled.

A further aspect of the invention is to provide a method of recycling metal materials constituting a process cartridge containing a toner, wherein in a crushing process cartridge is crushed to such an extent that the structural form of the process cartridge is disassembled, and the toner is recovered by suction and in a step of separating a container portion made of a resin material, a charging roller, a cleaning blade, a development sleeve and a photosensitive drum, which constitute the process cartridge for each component material, separation treatment is performed for each component material and metal materials separated in the step of separation reused.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
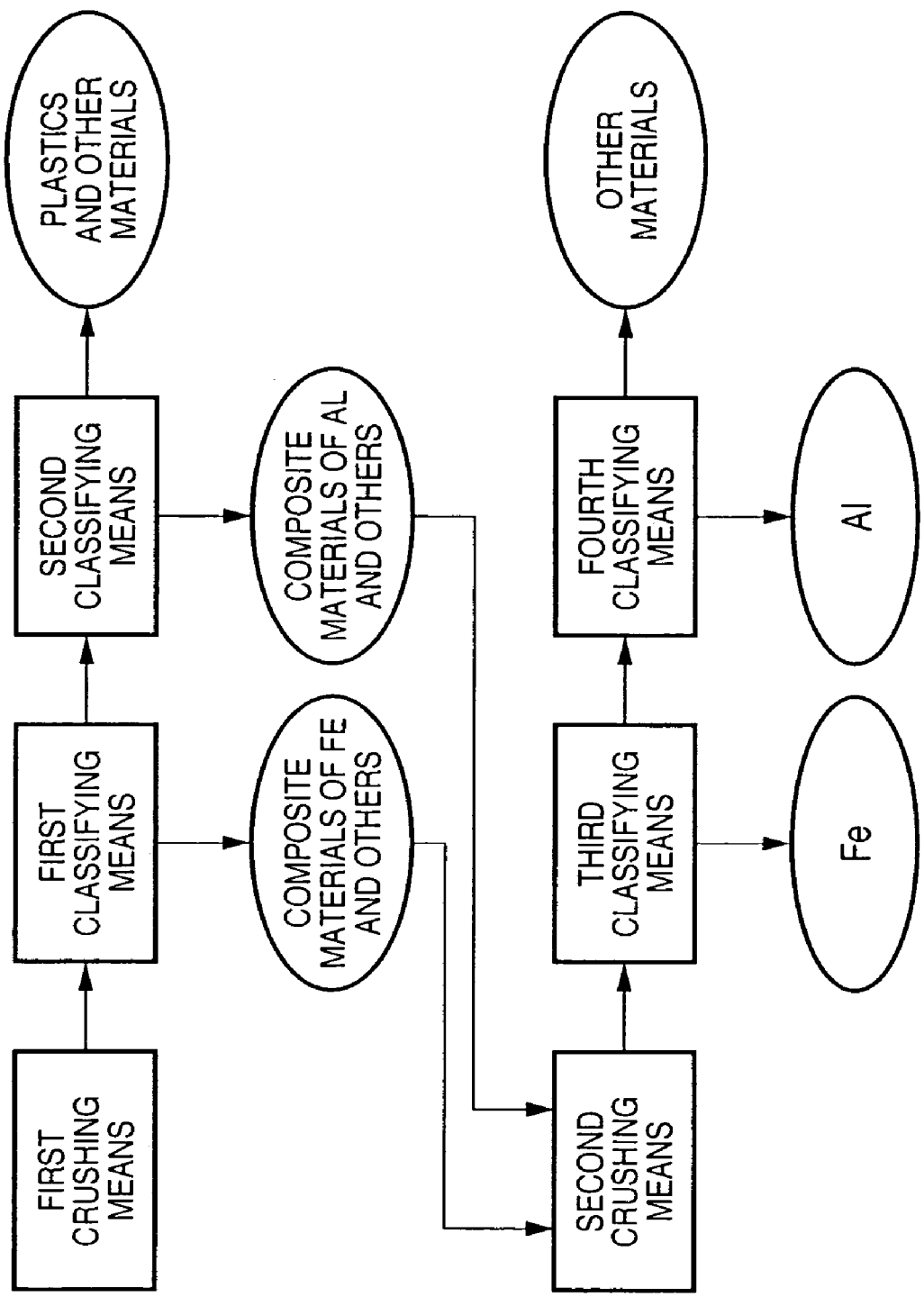
FIG. 1 is a schematic explanatory drawing of the steps of recycling a process cartridge to which the present invention is applied.

Embodiments of the present invention will be described below by referring to the drawings.

FIG. 1 is an explanatory drawing of the steps of recycling a process cartridge in order to carry out the invention.

Figure 2:
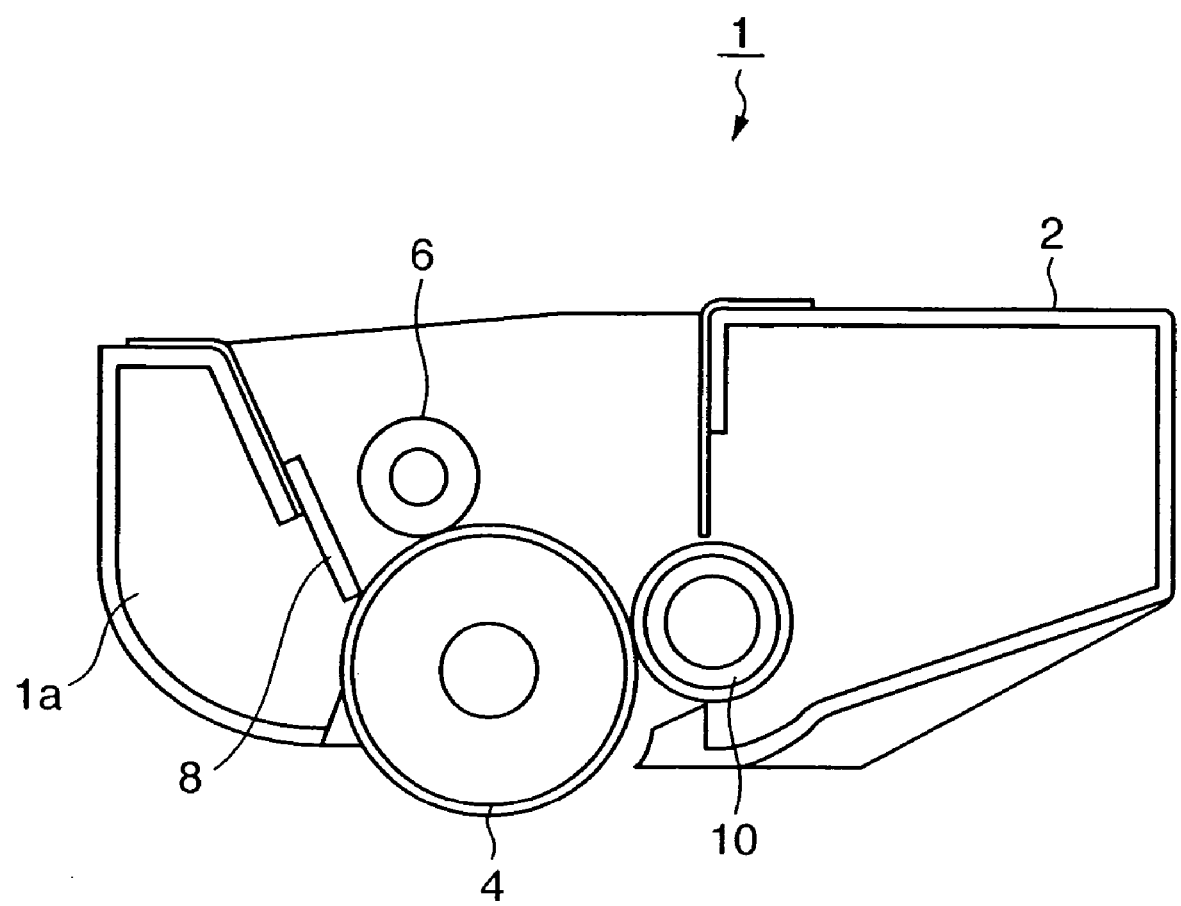
FIG. 2 is a schematic explanatory drawing of the makeup of a process cartridge.

FIG. 2 is an explanatory drawing of part of the makeup of an example of process cartridge to which the invention is applied.

Referring to the explanatory drawing of the steps of FIG. 1, in a primary crushing step, a process cartridge constituted by multiple materials is subjected to crushing treatment to the extent that the materials are separated from a container of the process cartridge in the shapes of parts, i.e., in a state in which rubber materials are not crushed.

With the crushing strength of primary crushing means, it is impossible to separate some component materials of a photosensitive drum etc., which are aluminum and resin materials.

In the primary crushing step, the container of the process cartridge is subjected to crushing treatment to the level of component parts, and a toner in the container is recovered by suction during this crushing treatment. After this crushing step, by use of primary metal separation means, such as magnet separation means and eddy current separation means, parts constituted by a plurality of component materials, such as ferrous materials, metal materials, such as aluminum, rubber materials and resin materials, are subjected to separation treatment in a state of parts in which rubber materials, resin materials and metal materials coexist.

Furthermore, the above-described parts subjected to the separation treatment in which rubber materials, resin materials and metal materials coexist, are subjected to a secondary separation treatment by use of secondary separation means whereby rubber materials, resin materials, etc. are separated from ferrous materials and aluminum materials. Furthermore, in a secondary metal separation step, which uses secondary metal separation means, such as magnetic separation means and eddy current separation means, high-purity ferrous materials and aluminum materials are obtained. The ferrous materials and aluminum materials are each subjected to melting treatment to thereby change the materials into forms capable of reuse as ferrous materials and aluminum materials.

FIG. 2 is an explanatory drawing of the makeup of a process cartridge as a material to be recycled to which the present invention is applied. In this figure, a process cartridge 1 is constituted by a container portion 2 made of a resin material, which is the main body part, and a photosensitive drum 4, a charging roller 6, a cleaning blade 8, a development sleeve 10, etc., which are assembled within the container.

The container portion 2 comprises a toner housing portion 1a to house a toner, which is a transfer residue, from the photosensitive drum in the process cartridge. The photosensitive drum 4 is fabricated by applying a photosensitive layer to an aluminum drum surface, and a driving gear made of a resin material etc., is attached to an end of the photosensitive drum.

In the charging roller 6, a roller is formed by wrapping an iron shaft member with rubber.

In the cleaning blade 8, a blade member made of urethane rubber is fixed to an iron substrate member.

In the development sleeve 10, a magnet made of a resin material is provided within a sleeve made of aluminum.

As described above, in the parts which constitute the process cartridge, ferrous materials, aluminum materials, metal materials such as stainless materials, rubber materials, resin materials, tape materials for bonding parts, etc., are used as component materials.

Figure 3:
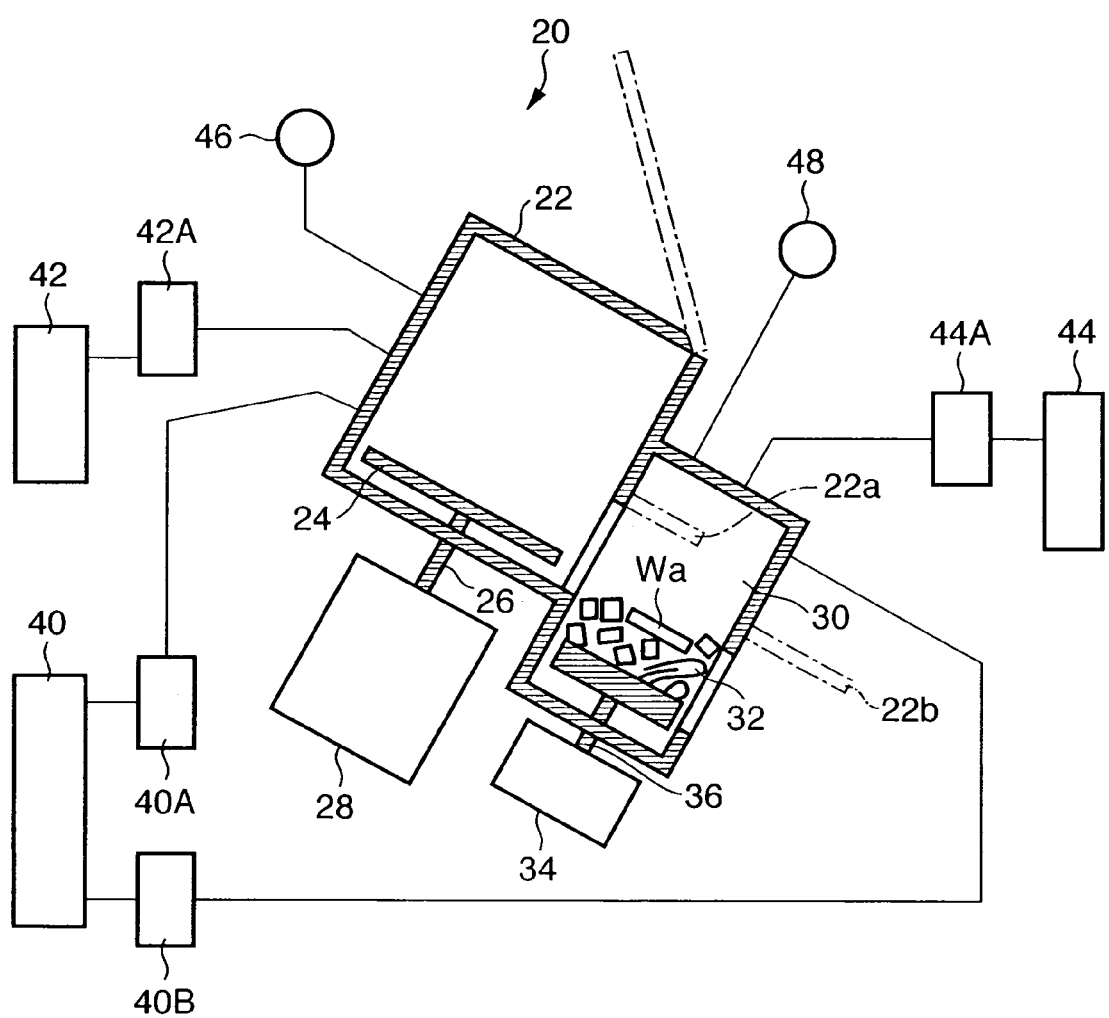
FIG. 3 is a schematic explanatory drawing of a crushing device.

FIG. 3 is an explanatory drawing of the makeup of part of a crushing device of primary crushing means adopted in this embodiment.

In the figure, the numeral 20 denotes the crushing device. This crushing device is constituted by an iron crusher container 22, a rotary blade for crushing, a shaft 26, a driving motor 28, etc.

The numeral 30 denotes a toner separation chamber which communicates with the above-described crushing device 22. This toner separation chamber is constituted by an impact member 32 which causes an impact force to act on parts crushed by the above-described crushing device, a motor 34, a shaft member 36, etc.

The numerals 22a, and 22b denote an opening and closing door of the crushing device 22, and the toner separation chamber 30, respectively.

The 40, 40A, 40B denote inert gas supply devices, and more specifically devices 40 and 40A supply an inert gas such as nitrogen gas to the above-described crushing device 22 via supply pipes and the devices 40 and 40B supply inert gas such as nitrogen to the toner separation chamber 30 via supply pipes.

The numerals 42, 44 denote means for recovering toner floating within the crusher container 22 and the toner separation chamber 30, respectively. The recovery means suck and recover the toner along with the nitrogen gas in the crusher container and separation chamber by use of suction means 42A, 44A.

The numerals 46, 48 denote concentration measuring sensors which measure the oxygen concentration within the above-described crusher container 22 and toner separation chamber 30, respectively. The supply volume of nitrogen gas is adjusted by introducing measurement signals of the sensors into control means (not shown) and the oxygen concentration in the container is adjusted thereby to prevent an induction of a dust explosion.

To use the crushing device, a plurality of process cartridges are placed into a crusher container of the above-described makeup, the oxygen concentration within the container is adjusted to not more than 10% by supplying nitrogen gas thereto, and the rotary blade for crushing is driven.

Within the container, the process cartridges are raised and thrown against the inner wall of the container by the rotary blade, with the result that the container portion made of a resin material is crushed by the impact force.

As a result of this, each of the above-described parts constituting the process cartridge is separated from the resin container.

(Primary Crushing Treatment)

Although the toner is simultaneously scattered within the crusher container, the toner, along with nitrogen gas, is sucked and discharged to outside the crushing device by use of suction recovery means. Therefore, a dust explosion by the toner in the crusher container is avoided.

The extent of crushing of a process cartridge in the above-described crusher container 22 is such that the process carriage is disassembled into each of the parts which constitute the process cartridge and, at the same time, the component materials of each part are deformed.

Figure 4:
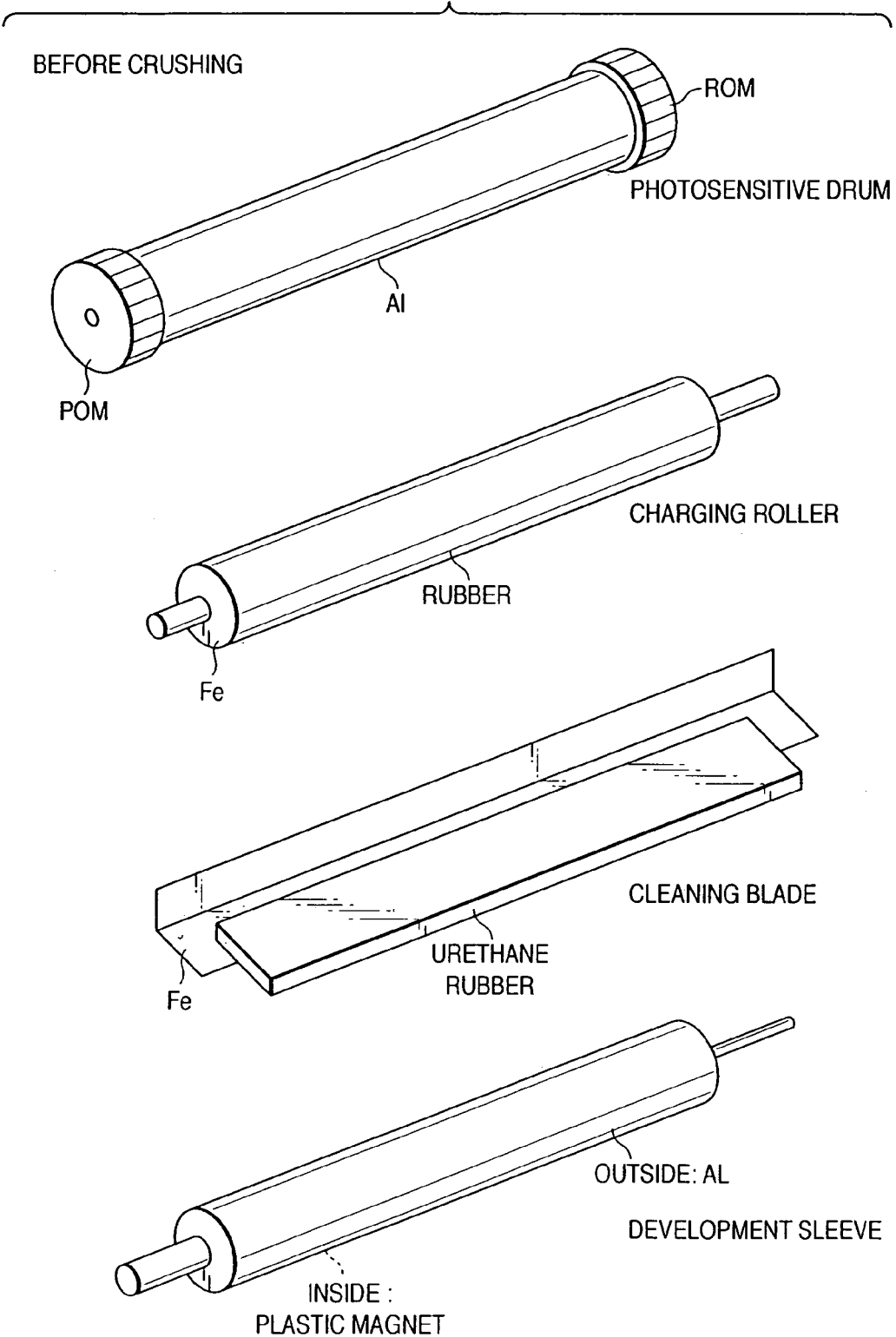
FIG. 4 is an explanatory drawing of each part of a process cartridge before the crushing process.
Figure 5:
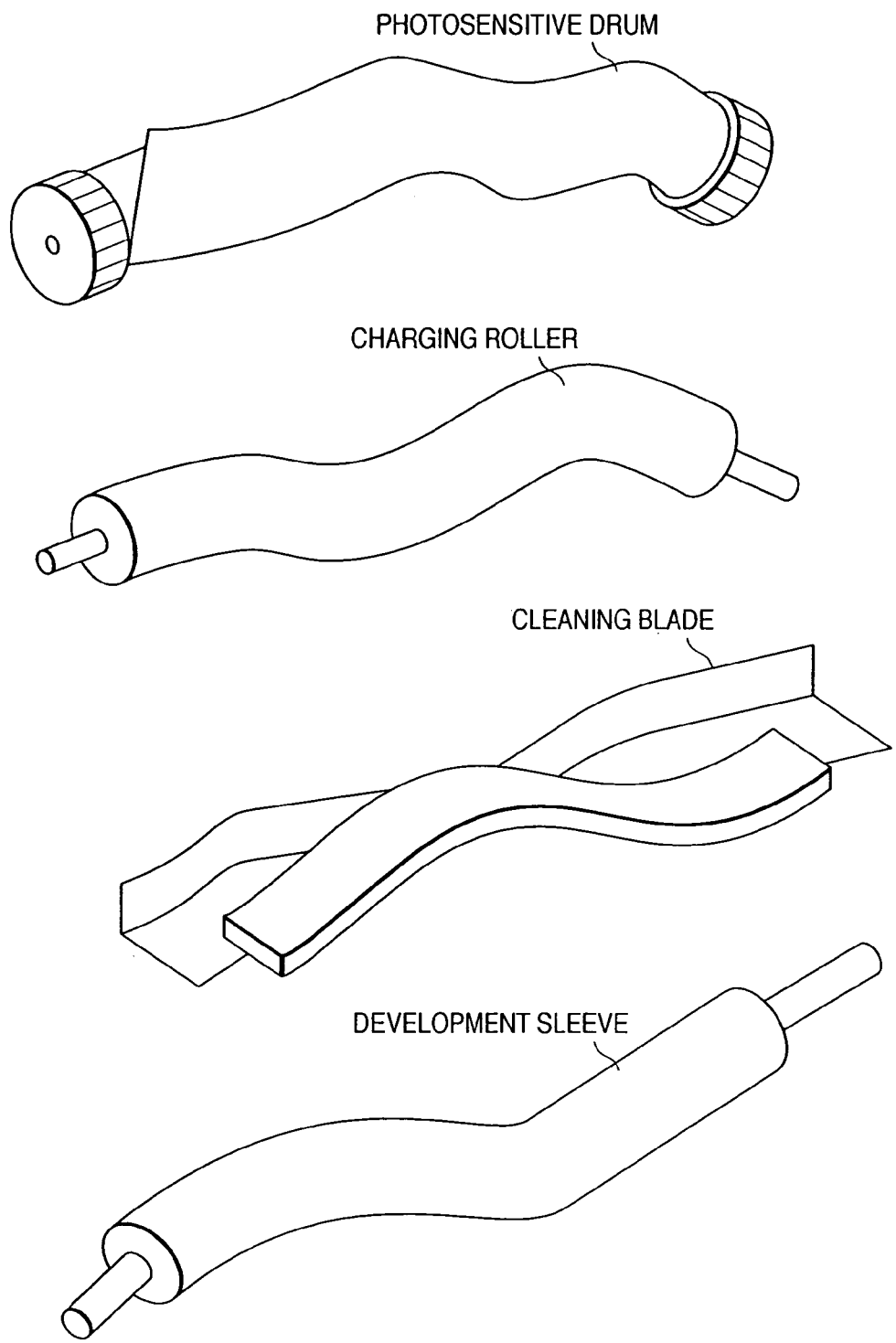
FIG. 5 is an explanatory drawing of each part of a process cartridge after the crushing process.

FIG. 4 schematically shows the state of each of the above-described parts assembled in a process cartridge before the crushing, and FIG. 5 schematically shows the state of each of the parts when the crushing process is completed.

As shown in FIG. 5, the crushing treatment in the crushing process is such that for the component materials of each part, each of the part materials is not finely crushed. That is, the shape of each part containing each metal material is in a deformation state which maintains the original shape and in a crushed state in which the disassembly of the parts is mainly achieved, and the crushed parts which are constituted by metal and rubber maintain the shapes of the parts, i.e., maintain a state in which rubber is not crushed, under such crushing conditions that permit separation from the process cartridge container.

The crushed elements that have been treated by the above-described primary crushing device as described above are caused to fall into the toner separation chamber 30.

The crushed elements in the toner separation chamber are subjected to an impact action by the impact means.

Even by use of the above-described recovery means, it is difficult to completely recover the toner which has been scattered in the above-described crushing device because it adheres to the crushed things.

For this reason, by applying an impact action to the crushed elements in the toner separation chamber, the unrecovered toner is separated from the crushed elements and sucked and recovered by the recovery means.

After the separation of the toner by the above-described toner separation chamber 30, the crushed elements are subjected to the separation of parts containing ferrous materials from the crushed elements by use of the magnetic separation means and eddy current separation means and the separation of parts containing aluminum.

The separation means may be used in random order.

(Primary Separation Treatment)

The separation of parts containing metals of ferrous materials and aluminum materials is performed in the above-described separation work and the primary separation step is completed.

Figure 6:
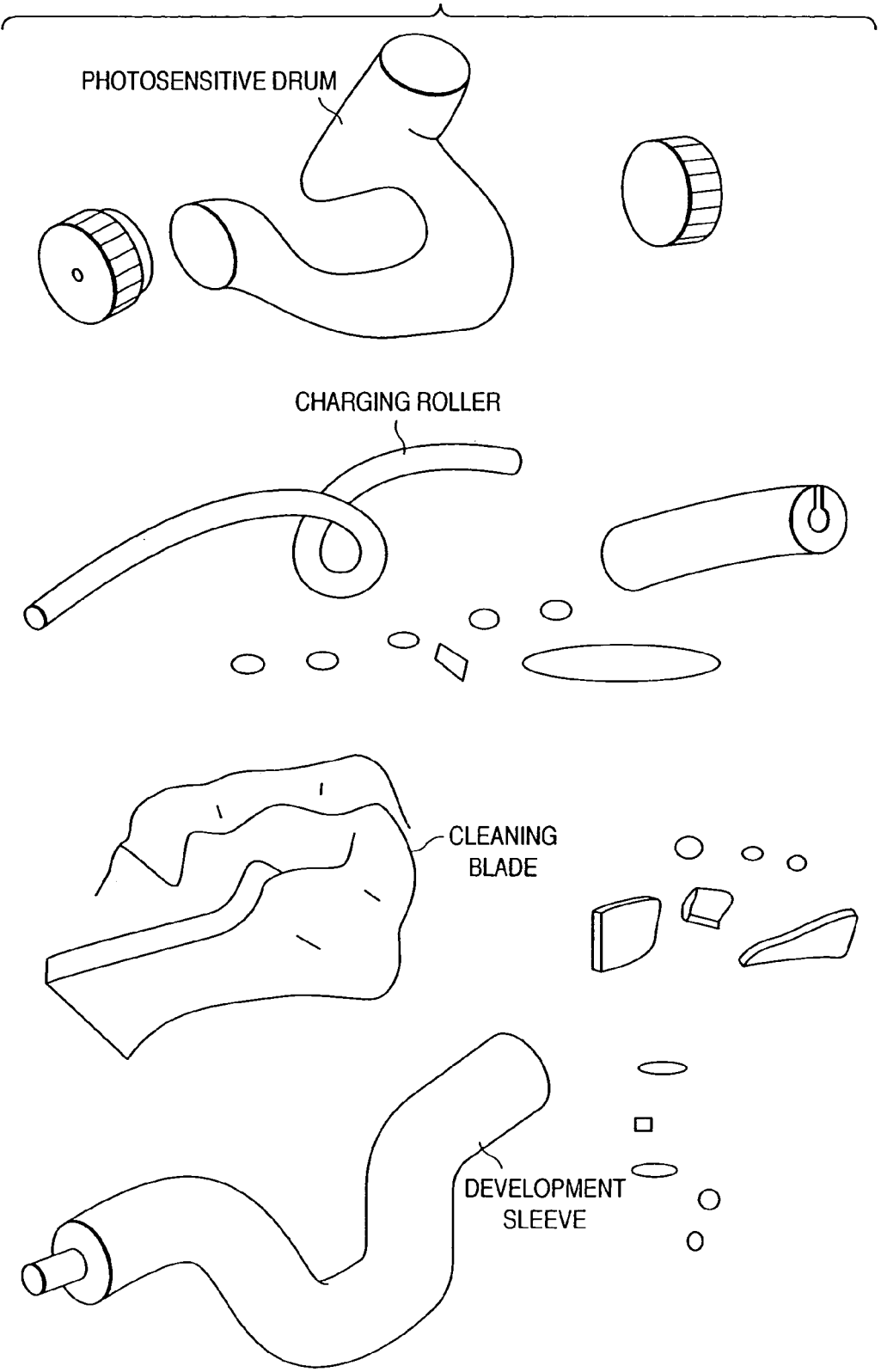
FIG. 6 is an explanatory drawing of forms in which a process cartridge is treated in the crushing process and metal metals are extracted by disassembling each part.

FIG. 6 shows the crushed state of portions of each part which are constituted by metal when the crushed elements, for which the separation work of materials other than the above-described metal materials has been finished, have been transferred to the secondary crushing step.

In the secondary crushing step, it is possible to use the crushing device used in the primary crushing step.

In this secondary crushing step, the crushing conditions, such as the crushing time, are set so that the separation of metals, rubber, etc., can be completely performed.

After the completion of the secondary crushing step, the crushed things are transferred into the separation chamber (secondary separation treatment) and separation treatment is performed as required.

After the separation treatment, high-purity ferrous materials can be recovered by separating ferrous materials by use of the magnetic separation means.

Furthermore, aluminum is separated by use of the eddy current separation means.

(Secondary Separation Treatment)

If the crushing treatment time in the secondary crushing step is long, the fracture due to the further crushing of crushed pieces of each part proceeds, each part assumes a form quite different from its original form, metal materials undergo plastic deformation and other composite members other than metals are separated from the metals. The deformation of metal materials is absolutely plastic deformation and fractures such as cutting, should not occur.

FIG. 6 shows this crushed state.

For example, for the photosensitive drum parts, the crushed state is such that the sleeve-like drum is longitudinally deformed and component parts such as the gear parts are detached.

In the case of the charging roller, as shown in FIG. 6, the crushed state is such that the rubber members are removed from the iron shaft member which has undergone plastic deformation by bending.

In this embodiment, as described above, by subjecting process cartridges to the crushing treatment and toner separation treatment and by efficiently performing the separation of metal materials by use of the magnetic separation means, eddy current separation means, etc., it was possible to obtain high recovery rates of metal materials from the process cartridges.

Incidentally, when the forms of the parts were as shown in FIG. 6, the recovery rate ferrous materials was not less than 90% and also for aluminum materials the recovery rate was not less than 90%.

As a result of this, metal materials of high-purity iron and aluminum could be obtained at low cost as recycled materials of recovered metal materials.

As many apparently widely different embodiments of the present invention can be made without departing from the spirit and scope thereof, it is to be understood that the invention is not limited to the specific embodiments thereof except as defined in the claims.

What is claimed is:

1. A method of recycling a process cartridge containing a toner, comprising the steps of:
    crushing a process cartridge containing a recovered toner to disassemble main component parts of the process cartridge and recovering the toner by suction;
    separating metal materials, including at least one of ferrous materials and aluminum material from other materials of the main component parts of the process cartridge disassembled in said crushing and disassembling step; and
    melting the separated metal matreial to thereby change the separated metal materials to forms capable of reuse as ferrous materials and/or aluminum materials.

2. The method of recycling a process cartridge containing a toner according to claim 1, wherein said crushing step is performed in a disassembly treatment chamber, wherein said crushing step produces disassembled major component parts in the disassembly treatment chamber, wherein said crushing step further comprises the step of:

transferring the disassembled major component parts of the process cartridge from the disassembly treatment chamber to a toner separation chamber adjacent to the disassembly treatment chamber; and causing an impact force to act on the disassembled major component parts of the process cartridge in the toner separation chamber to separate the toner from the disassembled major component parts of the process cartridge and, at the same time, recovering the separated toner by suction, wherein said metal materials separating step comprises the step of extracting the metal materials from said disassembled major component parts of the process cartridge by use of magnetic separation means and eddy current separation means, and wherein said melting step comprises the step of melting the extracted metal materials.

3. The method of recycling a process cartridge including a toner according to claim 2, wherein said extracting step extracts metal materials of a purity of not less than 90%.

4. A method of recycling metal materials constituting a process cartridge containing a toner, comprising the steps of:

crushing the process cartridge to disassemble photosensitive drum parts, charging roller parts, cleaning blade parts and development sleeve parts of the process cartridge and to separate the photosensitive drum parts, the charging roller parts, the cleaning blade parts and the development sleeve parts from container parts of the process cartridge made of a resin material a while recovering the toner by suction;

extracting metal materials from the crushed and separated parts of the process cartridge by separating dissimilar materials by use of magnetic separation means, eddy current separation means and gravity separation means; and recycling the extracted materials.

5. A method of recycling metal materials of a process cartridge containing a toner, said method comprising the steps of:

crushing the process cartridge to such an extent that the structural form of the process cartridge is changed and so that a process cartridge container portion made of a resin material, and a charging roller, a cleaning blade, a development sleeve and a photosensitive drum of the process cartridge, each of which contain metal materials and at least some of which contain non-metal materials, are disassembled, and recovering the toner by suction;

separating each component material of the container portion, the charging roller, the cleaning blade, the development sleeve and the photosensitive drum of process cartridge so that the metal materials are separated from the non-metal materials and the resin material; and reusing the metal materials separated in said separating step.

6. A method of recycling a process cartridge containing a toner, comprising the steps of:

crushing a process cartridge containing a toner to disassemble the process cartridge into main component parts thereof and recovering the toner by suction, separating main component parts containing metal materials from other main component parts, crushing the separated main component parts containing metal materials to disassemble the separated main component parts containing metal materials and other materials, and separating the metal materials from the other materials.

* * * * *

UNITED STATES PATENT AND TRADEMARK OFFICE
CERTIFICATE OF CORRECTION

PATENT NO. : 7,162,785 B2
APPLICATION NO. : 10/739146
DATED : January 16, 2007
INVENTOR(S) : Noboru Koumura et al.

It is certified that error appears in the above-identified patent and that said Letters Patent is hereby corrected as shown below:

IN THE DRAWINGS:
Sheet 1, Fig. 1, "FE" should read --Fe-- and "AL" should read --A1--.

COLUMN 1:
Line 17, "coping" should read --copying--.

COLUMN 4:
Line 33, "The" should read --The numerals--.

COLUMN 6:
Line 43, "rate" should read --rate for--.

COLUMN 7:
Line 7, "step" (second occurrence) should read --steps--.
Line 36, "a while" should read --while--.

COLUMN 8:
Line 34, "metal materials" should read --metal materials into metal materials--.

Signed and Sealed this

Twenty-third Day of September, 2008

JON W. DUDAS
*Director of the United States Patent and Trademark Office*